W. HAMMACK, J. HEDGES & L. MARTIN.
WHEEL.
APPLICATION FILED NOV. 25, 1911.
1,090,711.
Patented Mar. 17, 1914.
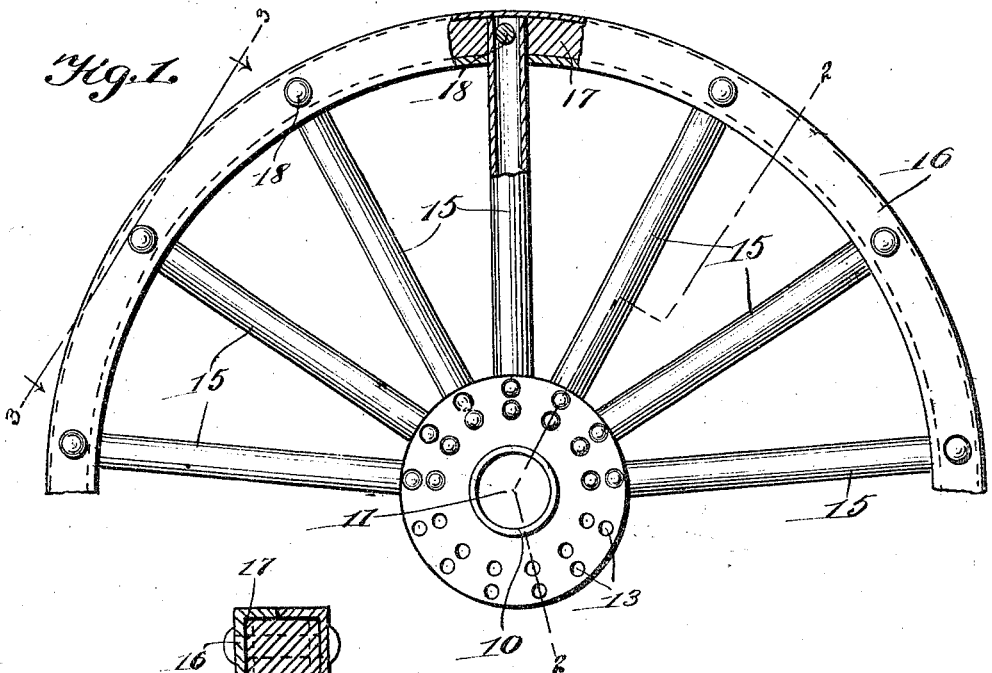
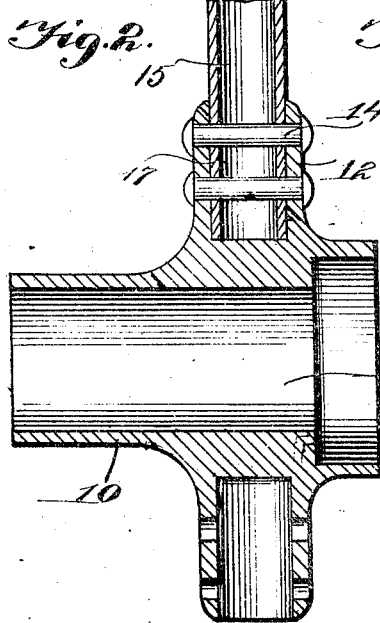
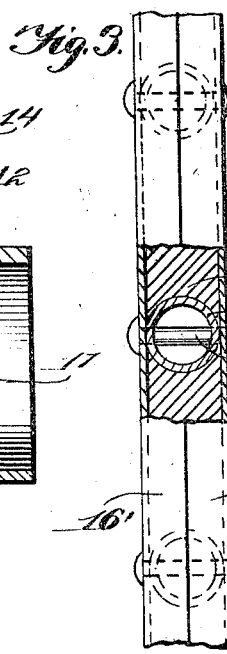
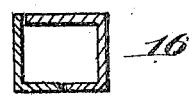
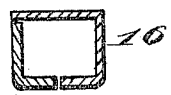
WITNESSES
William C. Sinton
Charles S. Wilson
INVENTORS
Jabez Hedges,
Lauren Martin, and
William Hammack.
By Wm. O. W. Sinter
Attorney

UNITED STATES PATENT OFFICE.

WILLIAM HAMMACK, JABEZ HEDGES, AND LAUREN MARTIN, OF LANCASTER, OHIO.

WHEEL.

1,090,711.  Specification of Letters Patent.  Patented Mar. 17, 1914.

Application filed November 25, 1911. Serial No. 662,319.

*To all whom it may concern:*

Be it known that we, WILLIAM HAMMACK, JABEZ HEDGES, and LAUREN MARTIN, citizens of the United States, residing at Lancaster, in the county of Fairfield and State of Ohio, have invented certain new and useful Improvements in Wheels; and we do hereby declare the following to be a full, clear, and exact description of the invention, such as will enable others skilled in the art to which it appertains to make and use the same.

This invention relates to wheels, and is designed particularly to construct a substitute for the wooden wheels which are now in use, said wheel being constructed throughout of metal, having a wooden or other suitable filling inserted therein.

It is the object of the present invention to produce a wheel which will not only increase the strength and durability of the wooden wheel now in use, but which will be as light, if not lighter, than other wheels.

With the above and other objects in view, this invention consists in the construction, combination and arrangement of parts, all as hereinafter more fully described, claimed and illustrated in the accompanying drawings, wherein:

Figure 1 is a fragmentary, side elevation of a wheel constructed in accordance with the present invention; parts thereof being in section; Fig. 2 is a section taken along lines 2—2 of Fig. 1; Fig. 3 is a section taken along lines 3—3 of Fig. 1; and Figs. 4 and 5 are detailed, transverse sections and modifications of the felly.

The wheel forming the subject matter of the present invention comprises a hub having a pair of spaced parallel outwardly extending flanges formed circumferentially thereabout, said flanges having mounted therein a plurality of radially extending tubular spokes which are riveted between said flanges, which form the body portion of the wheel, said spokes being constructed of any suitable metal. A felly is rigidly secured to the outer terminal of the spokes and constitutes a pair of U-shaped or other constructed members which are adapted to be secured together by rivets, said rivets passing through the spokes which enter into the hollow structure formed by said metal. The interior of the felly is provided with wood or composition filling which prevents any damage being imparted to said felly and increases the strength and durability thereof.

Reference being had more particularly to the drawings, 10 indicates generally the hub provided with a suitable transverse opening 11 for the reception of any suitable standard axle. This hub is provided with a pair of circumferentially arranged upwardly extending parallel flanges 12, said flanges being pierced by a plurality of alined openings 13, through which the rivets or other suitably alined attaching members 14 pass. These rivets 14 secure the tubular hollow spokes 15 to the hub, said spokes extending radially, as illustrated in Fig. 1, and constituting a wheel similar in construction to the ordinary wheel now in use.

A felly carried at the outer terminals of the spokes 15 is constructed of metal and in sections, in order that the wooden filling may be inserted therein. This felly indicated generally as 16 is constructed in its preferred form of the U-shaped sections 16′, said sections being spliced together in such a manner that their arms abut, thus permitting the insertion of the wooden filling there between. The spokes 15 enter the lower side of the felly and bear against the opposite side thereof, said spokes being retained in their operative position by the rivets 18 piercing said sections 16′. The spokes not only rest in the metal portion 16 of the felly, but are retained in the wooden filling, thus constituting substantially, but at the same time, a comparatively light structure.

A wheel of this construction is not subject to the weather, and furthermore is as light, if not lighter, than the wooden wheel now in use, at the same time increasing the strength and durability of the wheels now in use. The provision of the wooden filling within the felly 16 eliminates the possibility of said felly becoming dented or damaged and produces a solid rim, which is at the same time light.

Relative to the modification of the felly 16 illustrated in Figs. 4 and 5, the fundamental principle thereof is substantially the same as that illustrated in Figs. 1, 2 and 3, with the exception that in said views the joints between the sections of which the felly is constructed are at different localities. Fig. 4 illustrates the joints between the sections 16′, adjacent to one side of the bearing surface of the felly, whereas in Fig. 5, the joint in no way appears upon the bearing surface.

Having thus fully described our invention, what we claim as new, and desire to secure by U. S. Letters Patent is:

A wheel provided with a rim formed of two angular metal members between which wooden felly sections are placed, said angular members having their abutting edges disposed in the center of the periphery of the bearing portion of the wheel, and at the center of the inner side of the rim, spokes extending into said rim and bearing at their outer ends against the inner sides of the angular members, and bolts extending transversely through said angular members and through the spokes.

In testimony whereof we affix our signatures in presence of two witnesses.

WILLIAM HAMMACK.
JABEZ HEDGES.
LAUREN MARTIN.

Witnesses:
C. B. MARTIN,
GEO. H. HEED.